United States Patent [19]

Mayer

[11] 4,177,357

[45] Dec. 4, 1979

[54] SPATIALLY DISTRIBUTED ANALOG TIME DIVISION MULTIPLEXER

[75] Inventor: Gerald M. Mayer, East Lyme, Conn.

[73] Assignee: The United States of America as represented by the Secretary of the Navy, Washington, D.C.

[21] Appl. No.: 921,404

[22] Filed: Jul. 3, 1978

[51] Int. Cl.$^2$ .............................................. H04J 3/04
[52] U.S. Cl. ............................ 179/15 A; 179/15 AL; 179/15 BL
[58] Field of Search ........... 179/15 A, 15 BL, 15 AL; 340/1 R, 2, 3 R

[56] References Cited

U.S. PATENT DOCUMENTS

| 2,651,677 | 9/1953 | Lair | 179/15 AL |
| 2,723,309 | 11/1955 | Lair | 179/15 AL |
| 3,214,733 | 10/1965 | Spencer | 179/15 A |
| 3,763,318 | 10/1973 | Ross | 179/15 A |

Primary Examiner—David L. Stewart
Attorney, Agent, or Firm—Richard S. Sciascia; Arthur A. McGill; Prithvi C. Lall

[57] ABSTRACT

A multiplexer system for combining the signals from a multitude of spatially distributed sensors in a multi-sensor array. The system includes the fundamental features of combining signals from the spatially distributed sensors into a single composite signal, transmitting the composite signal to a receiving station, and decomposing it into its components in a demultiplexer at the receiving station.

9 Claims, 10 Drawing Figures

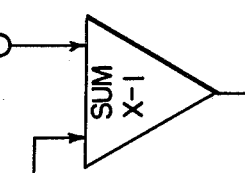
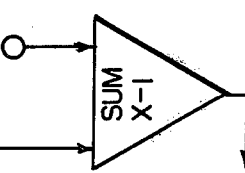
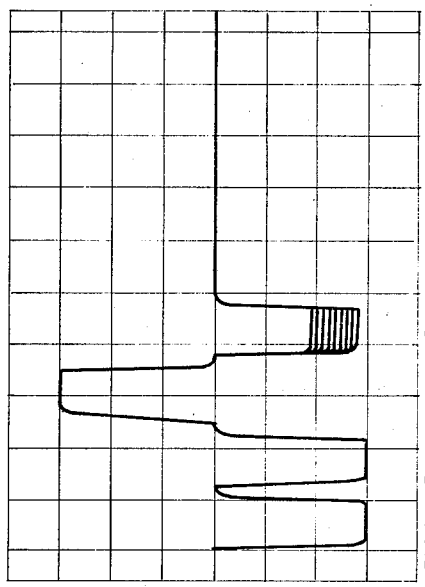
FIG. 4
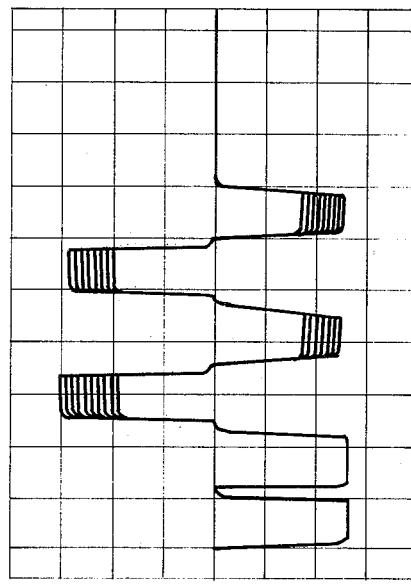
FIG. 5
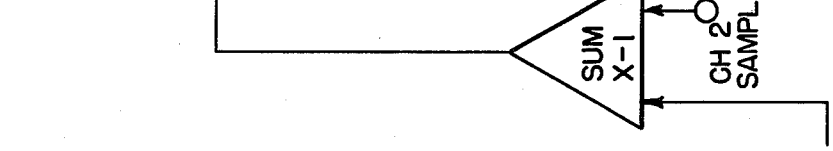
FIG. 2
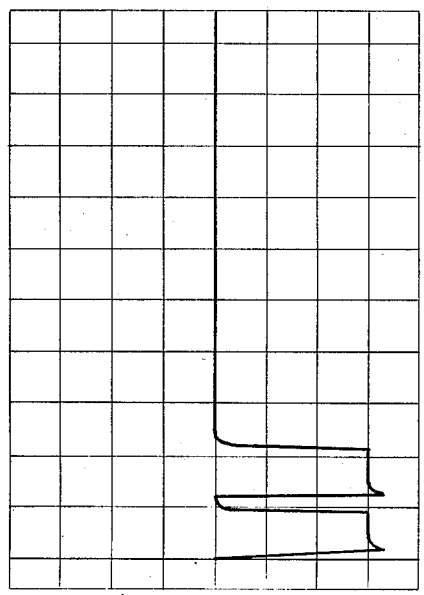
FIG. 3
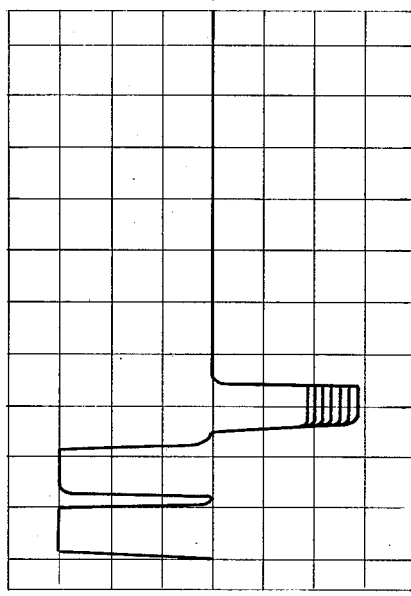

SPATIALLY DISTRIBUTED ANALOG TIME DIVISION MULTIPLEXER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to signal processing of acoustic signals in a body of water and particularly to a multiplexer system wherein the output of a plurality of spatially distributed acoustic and environmental sensors in an array is combined to form a single composite signal for transmitting and decomposing thereof at the receiving end.

Most of the methods presently in use for multiplexing signals from spatially distributed sensors in an array system are too large and too heavy to allow packaging of a large multi-element array and associated hardware in a sonobuoy package. Furthermore, such multiplexers consume too much power to allow continuous operation over extended periods of time within the capacity and limitations of the sonobuoy battery. Besides, none of these multiplexers is capable of theoretically bandwidth utilization efficiency over 50 percent. Since a sonobuoy radio channel is bandwidth limited, the acoustic performance that can be designed into the array is limited by the bandwidth utilization efficiency. Furthermore, the cost of present day multiplexers is too high for their use in a routinely expendable manner. It is thus desirable to have a multiplexer which is light, relatively inexpensive, and consumes very little power.

SUMMARY OF THE INVENTION

The multiplexer system of subject invention which is used for combining the signals from a plurality of spatially distributed sensors in a multi-sensor array includes the fundamental features of combining the signals from the spatially distributed sensors into a single composite signal, transmitting the composite signal by a radio link and decomposing the composite signal into its components using a demultiplexer. The composite signal is formed by gating the analog outputs of the hydrophones and other sensors in succession to unity gain inverting summers during the sample periods associated with each sensor. The signal is then transmitted via a radio link to a receiving end where it is demultiplexed by separating out the outputs from the even and odd numbered sensors through diode detectors. Comparators are used to receive the signals from the odd and even sensors and the outputs of the comparators are decoded by logic gates triggered in a synchronized fashion.

An object of subject invention is to have a multiplexer system which provides a means for combining the signals from a multitude of spatially distributed sensors into a single composite signal for transmission via a radio link to a remotely located receiving station, and subsequently decoding the composite signal into replicas of the signals from the individual sensors at the receiving station.

Another object of subject invention is to provide a multiplexer system for an acoustic array which obviates the need for analog to digital conversion or precise control of carrier frequencies and does not require a different electronic arrangement for each identifying channel.

An additional object of subject invention is to have a multiplexer system for an acoustic array including a plurality of spatially distributed acoustic and environmental sensors which can be packaged into a small sonobuoy housing and is of light weight.

Still another object of subject invention is to have a multiplexer system for an acoustic array which is relatively inexpensive for its use in a routinely expendable acoustic sensor.

Still another object of subject invention is to have a multiplexer system which consumes very little power and allows continuous operation over extended periods of time within the capacity limitation of the sonobuoy battery.

Still another object of subject invention is to provide a multiplexer system for an acoustic array which has a high bandwidth utilization efficiency.

Other objects, advantages and novel features of the invention will become apparent from the following detailed description of the invention when considered in conjunction with the accompanying drawings wherein:

BRIEF DESCRIPTION OF THE DRAWINGS

FIGS. 2-6 are the graphical representations of the pulses at the various components of the multiplexer system of FIG. 1;

DESCRIPTION OF A PREFERRED EMBODIMENT

Figure 1:
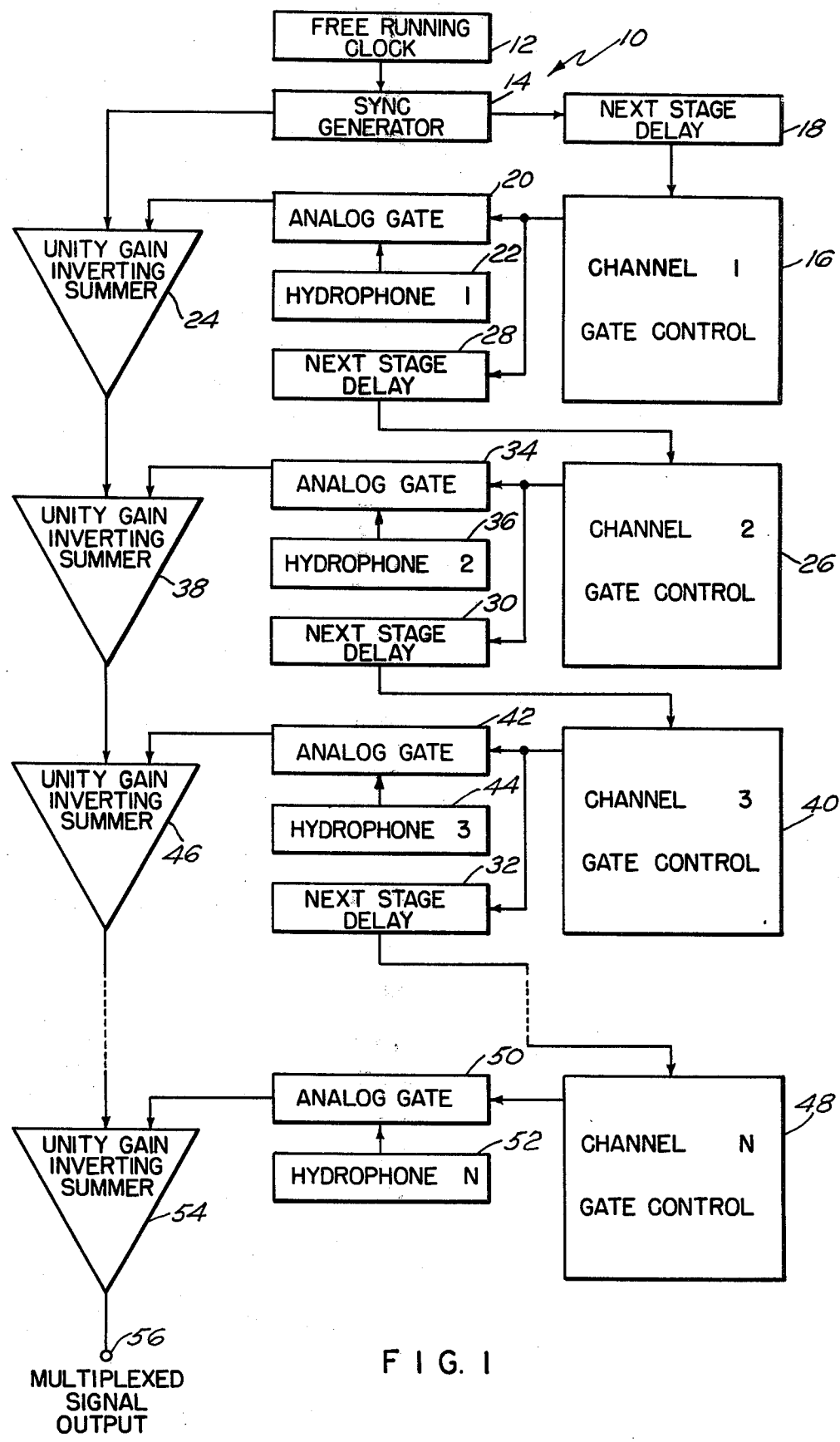
FIG. 1 is a block diagram of a multiplexer which shows the various components used for obtaining a composite signal.

Referring to the drawings wherein like reference characters designate like parts throughout the several drawings and more particularly to FIG. 1 thereof, a block diagram of a multiplexer 10 built according to the teachings of subject invention is shown. A multiplexing sequence is initiated by a free running clock 12 which has a period longer than the total time required to sequentially sample all of the individual hydrophones of the array and is shorter than that required to satisfy the NYQUIST criterion for the highest signal frequency of interest. Within these limits, the frequency of the clock is non-critical and need not be closely controlled. Each cycle of free running clock 12 activates sync generator 14 which produces a unique negative going signal or combination of signals that can be recognized in the demultiplexer as the starting point of a new sequence of multiplexer signals. A specific unique signal that is particularly attractive for practical systems is a signal of zero amplitude, i.e., for a period of time exceeding the sample time allotted for each channel. The end of the signal from sync generator 14 is used to activate channel #1 gate control 16 via next stage delay 18. The delay stage is used to provide a separation between the signal from sync generator 14 and the signal from analog gate 20. The inclusion of next stage delay 18 is optional in as much as the system will function satisfactorily with zero delay between components 14 and 16.

Analog gate 20 is a device that functions as a single pole switch that switches between "ON" state (low resistance) and "OFF" state (infinite resistance) in direct response to the state of logic at a control input. Channel #1 gate control 16 applies the necessary logic control signal to analog gate 20 and switches the gate to the "ON" state for the period of time selected as the sample period for the system. The sample period for each hydrophone is determined by the number of hydrophones to be sampled within the period of free running clock 12.

Hydrophone 22 applies analog signal to one pole of the switch in analog gate 20. The nature of the analog signal from hydrophone 22 is a time varying signal proportional to the acoustic pressure field, amplified, shaped and filtered in accordance with the overall system requirements, and superimposed on a DC voltage level of sufficient amplitude to ensure that the amplitude of the analog signal presented to analog gate 20 is greater than one volt positive at all times. When analog gate 20 is switched to the "ON" state of channel #1 gate control 16, the analog voltage from hydrophone 22 is connected to the input of unity gain inverting summer 24 which adds the signal from sync generator 14 and analog gate 20 and inverts the sum thereof. The signal at the output of unity gain summer 24 contains a positive replica of the signal from sync generator 14 and a negative replica of the signal from analog gate 20. The end of signal gate from channel #1 gate control 16 is used to activate channel #2 gate control 26 via next stage delay 28. Next stage delays 28, 30 and 32 are used to separate the data samples in the sequence of multiplexed signals. Inasmuch as sequential data samples are already separated into positive and negative amplitude regions by the unity gain inverting summers such as 24 at each channel, the system will function satisfactorily without the next stage delays such as 18. Inclusion of the next stage delays such as 18 is optional. They serve to decrease the channel to channel crosstalk at the expense of increasing the required transmission line bandwidth.

Upon activation of channel #2 gate control 26, the sequence of events is identical to that described for channel #1. Channel #2 gate control 26 is used to switch analog gate 34 to the "ON" state, thereby allowing the signal from hydrophone 36 to be connected to unity gain inverting summer 38 for a time equal to the predetermined sample period. Unity gain inverting summer 38 adds the signals from analog gate 34 and unity gain inverting summer 24, and inverts the sum. The signal at the output of unity gain inverting summer 38 contains a negative replica of the signal from sync generator 14, a positive replica of the signal from analog gate 20, and a negative replica of the signal from analog gate 34.

The end of the signal from channel #2 gate control 26 is used to activate channel #3 gate control 40, the sequence of operations is identical to that described for channels #1 and #2. Channel #3 gate control 40 is used to switch analog gate 42 to the "ON" state, thereby allowing the signal from hydrophone 44 to be connected to unity gain inverting summer 46 for a time equal to the predetermined sample period. Unity gain inverting summer 46 adds the signals from analog gate 42 and unity gain inverting summer 38, and inverts their sum. The signal at the output of unity gain inverting summer 46 contains a positive replica of the signal from sync generator 14, a negative replica of the signal from analog gate 20, a positive replica of the signal from analog gate 34, and a negative replica of the signal from analog gate 42.

The above described sequence of events is repeated in identical fashion at each channel, with each channel triggering the next, until they hydrophone outputs of all channels have been sequentially sampled. Channel #N gate control 48 is the control for the last sample to be added to the composite multiplexed signal and is used to switch analog gate 50 to the "ON" state, allowing the signal from hydrophone 52 to be connected to unity gain inverting summer 54, where it is added to the combined samples from all previous channels. The multiplexer system then goes to a quiescient state until the entire sampling sequence is initiated again by the next cycle of free running clock 12.

The multiplexed signal output at terminal 56 is available as the output of unity gain inverting summer 54. It is the signal that is transmitted to a remote receiving station by means of a radio link or wire link. FIGS. 2–6 show the sequential formation of the multiplexed signal output for the prototype model. As a way of illustration, the model uses a sync signal consisting of two negative going sample periods, a delay between samples of 24 percent of the sample period, and a total of four channels of analog information. FIG. 2 shows the negative going sync pulses and FIG. 3 shows the inverted sum of the sync pulses and the channel #1 sample. FIG. 4 shows the inverted sum of the signal in FIG. 3 and the channel #2 sample. FIG. 5 shows the multiplexed signal output consisting of two sync pulses and data samples from four channels. The signal shown in FIG. 5 is then transmitted to the receiver, where it is demultiplexed, or separated into individual signals, each of which contains samples from only one channel. The individual signals are then converted into replicas of the original analog signals by passing them through low-pass filters.

Figure 6:
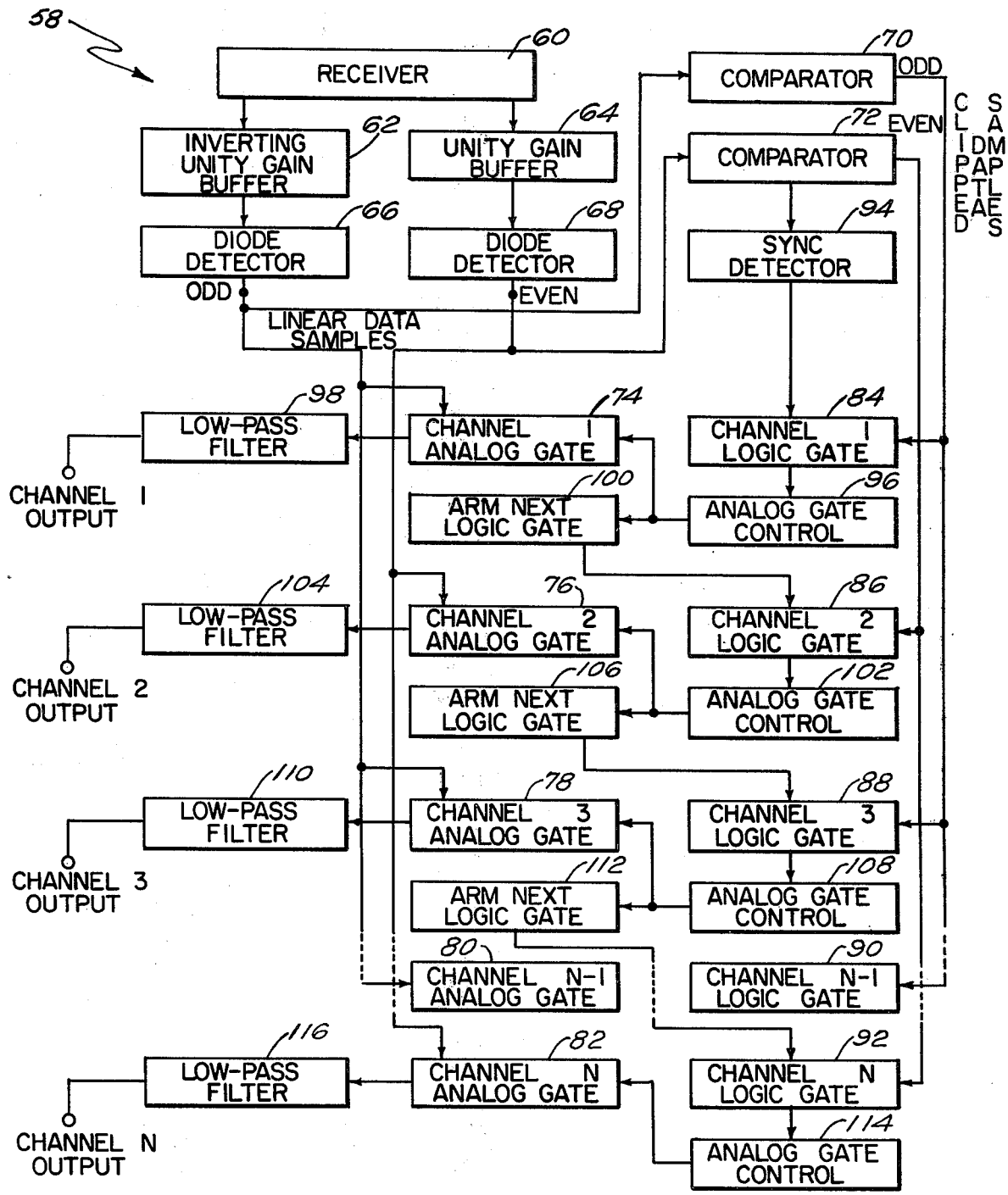

Referring to FIG. 6 which shows a block diagram of demultiplexer 58, the multiplexed signal is received by receiver 60, and directed to inverting unity gain buffer 62 and unity gain buffer 64, which provide inverted and non-inverted replicas of the received signal respectively. These signals are then passed through diode detectors 66 and 68, which allow only the positive polarity portions of the signal to pass. The output of diode detector 66 is a sequence of data samples containing only the samples from the odd numbered channels in the multiplexer, while the output of diode detector 68 contains the sync information and the data samples originating in the even number channels for the multiplexer. It is possible to separate the odd and even data channels in this manner because of the alternate inversion of data samples in the multiplexing format.

The outputs of diode detectors 66 and 68 go to their respective comparators 70 and 72 and to the analog signal input of analog gates 74, 76, 78, 80 and 82 of their respective channels. Diode detector 66 provides the signal for the odd number demultiplexer channels, and diode detector 68 provides the signal for the even number demultiplexer channels. Comparator 70 receives the output of diode detector 66 and converts it into a digital logic signal with timing identical to the output signal of diode detector 66, but with the sampled analog information removed. Comparator 72 performs a similar operation on the output of diode detector 68. The digital logic output signals from comparators 70 and 72 are used as input to logic gates 84, 86, 88, 90 and 92 of their respective channels with comparator 70 providing the signal for the odd number channel gates, and comparator 72 providing the signal for the even number channel gates.

The output of comparator 72 also provides the input for sync detector 94, which contains appropriate logic circuitry for recognizing the unique sync signal. Upon recognizing the sync signal, sync detector 94 generates a logic level output signal of a duration long enough to overlap the time period occupied by the channel #1 data sample, but short enough so that it does not overlap any other data samples. Channel #1 logic gate 84 serves as a coincidence detector between the output signals from comparator 70 and sync detector 94. Coincidence is detected immediately upon arrival of the logic level replica of the channel #1 data sample contained in the output signal of comparator 70.

Channel #1 logic gate 84 activates analog gate control 96 immediately upon detection of coincidence. Analog gate control 96 provides a logic level output pulse to the control input of channel #1 analog gate 74. The duration of this control signal is equal to or less than the duration of the hydrophone sample period. All analog gates such as 74 in the demultiplexer 58 are functionally identical to the analog gates such as 20 in the multiplexer 10; that is, they function as single pole switches which switch between the "ON" state (low resistance), and "OFF" state (high resistance) in response to the logic state at the control input. Channel #1 analog gate 74 is switched to the "ON" state by the control signal from analog gate control 96, and the signal from diode detector 66 passes through channel #1 analog gate 74 and into low pass filter 98. Since channel #1 analog gate 74 is switched "ON" only for that time period during which the channel #1 data sample is present, and is "OFF" for all other times, low pass filter 98 sees only those data samples uniquely associated with the output of hydrophone 22. The output of low pass filter 98 is therefore a replica of the analog signal from hydrophone 22.

The signal from analog gate control 96 is also routed to arm next logic gate 100, which detects the trailing edge of the control signal marking the transition of channel #1 analog gate 74 to the "OFF" position. That event indicates that the channel #1 data sample has passed, and that the next event that will occur in the composite multiplexed signal is the arrival of the channel #2 data sample. Arm next logic gate 100 generates a logic level output signal of a duration long enough to overlap the time period occupied by the channel #2 data sample, but short enough so that it does not overlap any other data samples. The sequence of events occurring at channel #2 of the demultiplexer 58 is thereafter identical to that described for channel #1.

Channel #2 logic gate 86 serves as a coincidence detector between the signals from arm next logic gate 100 and comparator 72. Coincidence is detected immediately upon arrival of the logic level replica of the channel #2 data sample contained in the output signal of comparator 72. Immediately upon detection of coincidence, channel #2 logic gate 86 activates analog gate control 102, which switches channel #2 analog gate 76 to the "ON" state. The output of diode detector 68 passes through channel #2 analog gate 76 and into low pass filter 104. Since low pass filter 104 sees only those data samples uniquely associated with hydrophone 36, its output is a replica of the analog signal from hydrophone 36.

The trailing edge of the control signal to channel #2 analog gate 76 is detected by arm next logic gate 106, which provides a logic level output of a duration long enough to overlap the time period occupied by the channel #3 data sample. The sequence of events described for channels #1 and #2 is again repeated at channel #3. Channel #3 logic gate 88 detects coincidence between the outputs of arm next logic gate 106 and comparator 70. The detection of coincidence activates analog gate control 108, which switches channel #3 analog gate 78 to the "ON" state and allows the output of diode detector 66 to pass through channel #3 analog gate 78 and into low pass filter 100 which provides an output that is a replica of the analog signal from hydrophone 44.

The trailing edge of the control signal to channel #3 analog gate 78 is detected by arm next logic gate 112, which provides the signal necessary for coincidence detection of the arrival of the channel #4 data sample. This process is repeated, with each demultiplexer channel arming the next, until all channels of hydrophone data have been separated. The arrival of the last data sample is detected by channel #N logic gate 92, which activates analog gate control 114. Channel #N analog gate 82 is then switched to the "ON" state, allowing the last channel data sample to enter low pass filter 116, which provides an output that is a replica of the analog signal from the last hydrophone.

Upon completion of the demultiplexing cycle, the system enters a quiescient state until the entire sequence is restarted by detection of the next sync signal signifying the start of a new sequence of data samples. The demultiplexer 58 therefore adapts itself to the received signal, and switches the demultiplexer analog gates in response to the actual arrival of the data samples, rather than in a predetermined timing sequence. The ability of the demultiplexer 58 to adapt itself to the timing of the received signal is significant in that it eliminates the need for precise timing control in both the multiplexer and demultiplexer.

Figure 7:
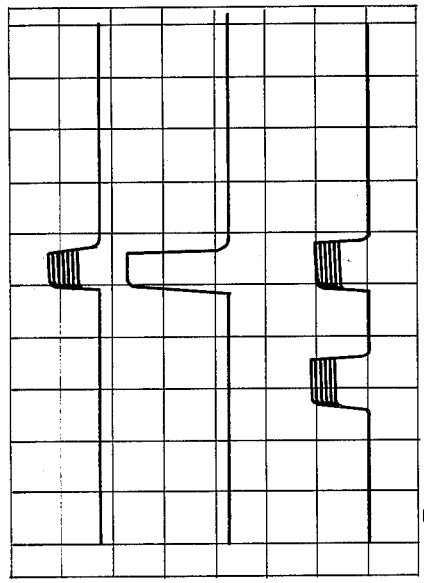
FIG. 7 is a block diagram of a demultiplexer of the present system.
Figure 9:
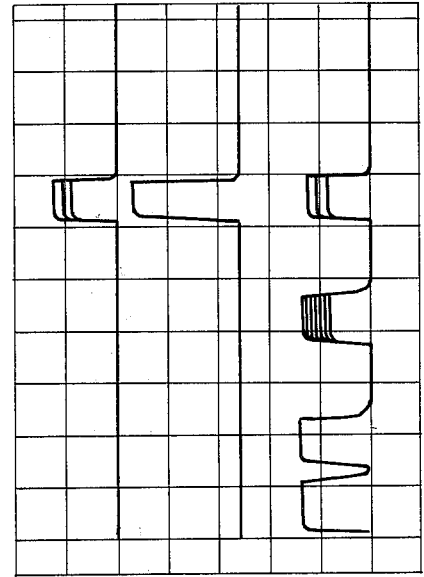
FIGS. 8-10 are the graphical representations of the output pulses at various components of the demultiplexer of FIG. 7.
Figure 8:
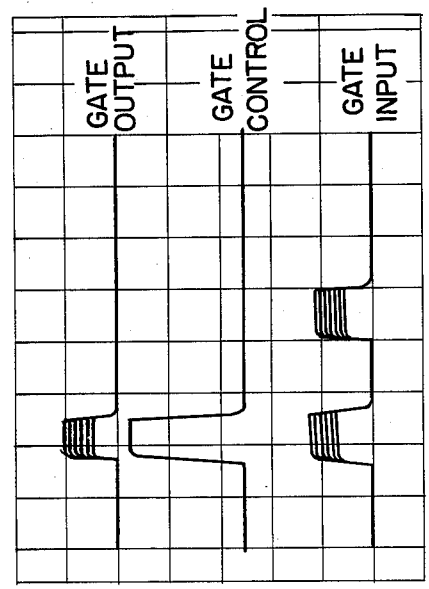
Figure 10:
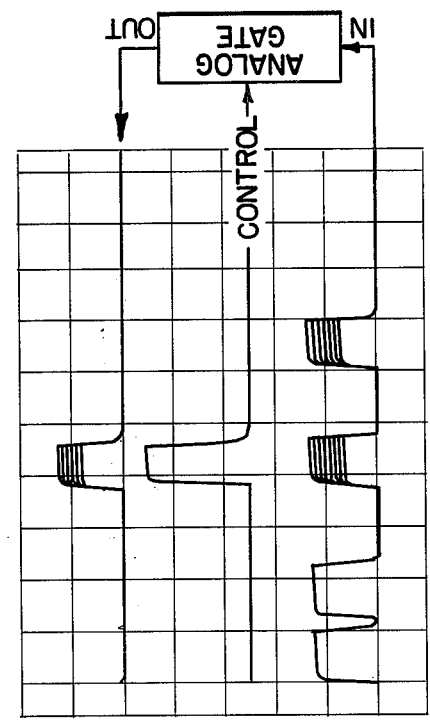

FIGS. 7–10 show the signals at each of the analog gates in the prototype model. FIG. 7 shows the signals at channel 1; the lower trace representing the signal at the analog signal input, the middle trace showing the signal at the control input, and the upper trace showing the analog gate output. A similar signal format in FIGS. 8, 9 and 10 show how the samples from data channels #2, #3 and #4 respectively are separated from the composite multiplexed signal.

It should be noted that the various components used in the multiplexer and the demultiplexer are commercially available off-the-shelf items and can be interchanged with their equivalents. As an illustration, without imposing any limitation, the delays and gate controls can be 74LS221 and 74C221 manufactured by Texas Instruments Corp., RCA and Intersil. Analog gates are preferably CD4016 and CD4066 by RCA; inverting summing amplifiers can be CA3140 by RCA, TL071 by Texas Instruments Corp., and LM318 by National Semiconductor; low pass filters can be LM324 and LM3900 by National Semiconductor, TL074, TL064 and TL084 by Texas Instruments Corp.; comparators can be LM311 and LM339 by National Semiconductor; and sync detectors can be 74LS221, 74C221 and 74221 by either National Semiconductor or Texas Instruments. The above-identified units can be interchanged without deviating from the teachings of subject invention.

Briefly stated, a multiplexer system according to the teachings of subject invention includes a multiplexer which combines the acoustic signal from a plurality of spatially distributed hydrophones and environmental sensors of an acoustic array to obtain a composite signal which is transmitted via a radio link or a wire link to a receiving station. The composite signal is decomposed at a receiving station into its components by means of a demultiplexer. The ability of the demultiplexer to adapt itself to the timing of the received signal is significant in that it eliminates the need for precise timing control in both the multiplexer and demultiplexer.

Obviously, many modifications and variations of the present invention are possible in the light of the above teachings. As an example, the various electronic components used in the multiplexer and the demultiplexer can be substituted by their equivalents. Furthermore, the teachings of subject invention can be implemented with any of literally infinite number of circuit configurations. However, the implementation on a single, monolithic integrated circuit is optimum with regard to size, weight, power consumption, and cost of a production device. It is therefor understood that within the scope of the appended claims the invention may be practiced otherwise than as specifically described.

I claim:

1. An analog time division multiplexer system for transmitting analog signals from a first plurality of spatially distributed sensors of a multi-sensor array which comprises:

multiplexing means including a second plurality of channels, each member of said second plurality of channels corresponding to a respective member of said first plurality of spatially distributed sensors of said multi-sensor array, said multiplexing means combining an analog signal from each member of said first plurality of spatially distributed sensors with a DC level and with the analog signals from the preceding sensors of said first plurality of sensors to form a composite signal and inverting the polarity of the combination;

a free running clock providing an output thereof and having a time period longer than the time for sequentially sampling the outputs of various members of said first plurality of spatially distributed sensors;

a sync generator being triggered by the output of said free running clock, said sync generator producing an output thereof for use as a starting reference in said multiplexing means for a new sequence of multiplexed signals from said first plurality of spatially distributed sensors of said multi-sensor array;

transmission means for transmitting said composite signals to a remote receiving station; and demultiplexing means including a third plurality of channels having each member thereof corresponding to a respective member of said first plurality of said spatially distributed sensors and a respective member of said second plurality of channels of said multiplexing means, said demultiplexing means decomposing said composite signal into the components thereof at said receiving station.

2. The multiplexer system of claim 1 wherein each channel of said second plurality of channels includes a channel gate control, an analog gate and a unity gain inverting summer; said channel gate control being activated by the output of said sync generator and the output of said channel gate control controlling said analog gate; and said unity gain inverting summer adding the output signal of said sync generator, the output of said analog gate and inverting the sum thereof; and the signal from said channel gate control activating the channel gate control of the next channel of said second plurality of channels.

3. The multiplexer system of claim 2 wherein the unity gain inverting summer of each member of said second plurality of channels adds the signals from the analog gate of the instant channel of said second plurality of channels and unity gain inverting summer of the preceding channel of said second plurality of channels and inverts the sum thereof.

4. The multiplexer system of claim 3 wherein each member of said second plurality of channels of said multiplexing means includes a next stage delay between the channel gate control thereof and the channel gate control of the succeeding channel of said second plurality of channels.

5. The multiplexing system of claim 4 wherein said demultiplexing means includes:

a receiver for receiving the composite signal from said multiplexing means;

an inverting unity gain buffer receiving the input thereof from said receiver;

a unity gain buffer receiving the input thereof from said receiver;

a first diode detector receiving the input thereof from the output of said inverting unity gain buffer;

a second diode detector receiving the input thereof from the output of said unity gain buffer;

a first comparator receiving an input thereof from said first diode detector;

a second comparator receiving an input thereof from said second detector;

a sync generator being activated by the output of said second comparator; and said third plurality of channels.

6. The multiplexer system of claim 5 wherein each member of said third plurality of channels includes:

a channel logic gate being activated by the output of the sync generator of said demultiplexing means for the first channel of said third plurality of channels and activated by an arm next logic gate for each of the succeeding channels for the remaining channels of said third plurality of channels; and the output of said first comparator for the odd channels and the output of said second comparator for the even channels of said third plurality of channels;

an analog gate control triggered by the output of the channel logic gate of the instant channel;

a channel analog gate receiving as inputs the output of the analog gate control, the output of said first comparator for the odd channels of said third plurality of channels and the output of said second comparator for the even channels of said third plurality of channels and the output of said first diode detector for the odd channels of said third plurality of channels and the output of second diode detector for the even channels of said third plurality of channels; and an arm next logic gate receiving the input thereof from the output of the analog gate control of the instant channel of said third plurality of channels.

7. The multiplexer system of claim 6 where the output of the channel gate of each member of said third plurality of channels is passed through a low pass filter to obtain a component of the decomposed signal corresponding to each member of said plurality of sensors of said array.

8. A method of transmitting signals from a first plurality of spatially distributed sensors of a multi-sensor array using a multiplexer system including a multiplexer means having a free running clock, a sync generator and means for transmission of signals to a remote receiving station and demultiplexing means at the receiving station, which includes the steps of:
- starting the sequence of forming a composite signal from the outputs of the members of said plurality of spatially distributed sensors using the free running clock and the sync generator;
- adding the signal from each of said plurality of spatially distributed sensors to a preselected DC voltage to obtain first outputs;
- combining each first output with the preceding outputs and inverting polarity, thereby obtaining a composite signal comprised of sequential elements from respective outputs of the sensors, each element of the composite signal differing in polarity from adjacent elements;
- transmitting said composite signal to the receiving station; and
- decomposing said composite signal at the receiving station using a demultiplexer.

9. The method of claim 8 wherein the steps of decomposing said composite signal at said receiving station further includes the steps of:
- processing said composite signal after inversion thereof for the odd channels of said third plurality of channels and without inversion for the even channels of said third plurality of channels;
- filtering said composite signal; and
- decomposing said composite signals into the components thereof.

* * * * *